(12) United States Patent
Zheng et al.

(10) Patent No.: US 7,394,948 B1
(45) Date of Patent: Jul. 1, 2008

(54) HIGH SPEED OPTICAL PHASE MODULATOR

(75) Inventors: Dawei Zheng, Alhambra, CA (US);
Dazeng Feng, Arcadia, CA (US);
Anthony Kewitsch, Santa Monica, CA (US); George Rakuljic, Santa Monica, CA (US)

(73) Assignee: Kotura, Inc., Monterey Park, CA (US)

( * ) Notice: Subject to any disclaimer, the term of this patent is extended or adjusted under 35 U.S.C. 154(b) by 168 days.

(21) Appl. No.: 11/146,898

(22) Filed: Jun. 7, 2005

Related U.S. Application Data

(60) Provisional application No. 60/605,589, filed on Aug. 30, 2004, provisional application No. 60/577,636, filed on Jun. 7, 2004.

(51) Int. Cl.
*G02F 1/035* (2006.01)
*G02B 6/26* (2006.01)
*G02B 6/42* (2006.01)

(52) U.S. Cl. .................................. 385/3; 385/2; 385/40
(58) Field of Classification Search .................... 385/2, 385/3, 8, 14, 40, 129–132
See application file for complete search history.

(56) References Cited

U.S. PATENT DOCUMENTS

| | | | |
|---|---|---|---|
| 4,997,246 A * | 3/1991 | May et al. ....................... | 385/2 |
| 5,125,065 A * | 6/1992 | Stoll et al. ................... | 385/130 |
| 6,278,822 B1 * | 8/2001 | Dawnay ....................... | 385/50 |
| 6,298,177 B1 * | 10/2001 | House ............................ | 385/3 |
| 7,251,408 B1 * | 7/2007 | Gunn et al. .................. | 385/132 |

OTHER PUBLICATIONS

Alping, A., et al., *Highly Efficient waveguide Phase Modulator for Integrated Optoelectronics*; Appl. Physics Letters, vol. 48, No. 19 May 12, 1986; pp. 1243-1245.
Barrios, C., *Electrooptic Modulation of Silicon-on-Insulator Submocrometer-Size Waveguide Devices*; Journal of Lightwave Technology, vol. 21, No. 10, Oct. 2003; pp. 2332-2339.
Cui Yasong, et al., *Modeling and Design of GaAs Traveling-Wave Electrooptic Modulators Based on the Planar Microstrip Structure*; Journal of Lightwave Technology, vol. 24, No. 6, Jun. 2006; pp. 2368-2379.
Gan, Fuwan et al., *High-Speed Silicon Electrooptic Modulator Design*, IEEE Photonics Technology Letters, vol. 17, No. 5, May 2005, pp. 1007-1009.
Liu, Ansheng, et al., *A High-speed Optical Modulator Based on a Metal-Oxide-Semiconductor Capacitor*, Nature, vol. 427, Feb. 12, 2004, pp. 615-618.

(Continued)

*Primary Examiner*—Sung Pak
*Assistant Examiner*—Daniel Petkovsek
(74) *Attorney, Agent, or Firm*—Gavrilovich, Dodd & Lindsey, LLP

(57) ABSTRACT

An optical device includes a phase modulator having a waveguide on a substrate. The phase modulator also includes an n-type region having a proximity to a p-type region that causes formation of a depletion region when a bias is not applied to the modulator. The depletion region is at least partially positioned in the light signal carrying region of the waveguide. The phase modulator is tuned by applying a reverse bias to the phase modulator. The reverse bias changes the size of the depletion region.

18 Claims, 12 Drawing Sheets

OTHER PUBLICATIONS

Mendoza-Alvarez, L.G., *Analysis of Depletion Edge Translation Lightwave Modulators*; Journal of Lightwave Technology, vol. 6, No. 6, Jun. 1988; pp. 793-808.

Noguchi Kazuto. et al., *Millimeter-Wave Ti:LiNbO₃ Optical Modulators*; Journal of Lightwave Technology, vol. 16, No. 4, Apr. 1998; pp. 615-619.

Png, Ching, *Optical Phase Modulators for MHz and GHz Modulation in Silicon-on-Insualtor (SOI)*; Journal of Lightwave Technology, vol. 22, No. 6, Jun. 2004; pp. 1573-1582.

Tang, C.K., et al., *Highly Efficient Optical Phase Modulator in SOI Waveguides*; Electronics Letters Mar. 16, 1995 vol. 31 No. 6, pp. 451-452.

Xu, Qianfan, et al., *Micromotre-scale Silicon Electro-optic Modulator*; Nature, vol. 435, May 19, 2005, pp. 325-327.

\* cited by examiner

HIGH SPEED OPTICAL PHASE MODULATOR

RELATED APPLICATIONS

This application claims the benefit of U.S. Provisional Patent Application Ser. No. 60/605,589, filed on Aug. 30, 2004, entitled "High Speed Silicon Modulator;" and of U.S. Provisional Patent Application Ser. No. 60/577,636, filed on Jun. 7, 2004, entitled "Ultra-Fast Silicon Modulators Based on Reverse Bias PN and PIN Junctions," each of which is incorporated herein in its entirety.

FIELD

The present invention relates to optical devices and more particularly to optical modulators.

BACKGROUND

Optical modulators are used to encode information onto light signals. It is desirable to encode information at a rate of about 10 to 40 Gbps. However, encoding data at these rates has proven difficult due to the limitations of optics and the associated electronics. Existing practice involves making these devices using exotic materials like $LiNbO_3$ and InP for the optical modulation and GaAs hetero-junction-bipolar (HT) transistor for the driver circuit, which makes them expensive and not practical for many applications. As a result, there is a need for a practical modulator that can encode data at these rates.

SUMMARY

An optical device that includes a phase modulator is disclosed. The phase modulator includes a waveguide on a substrate. The phase modulator also includes an n-type region having a proximity to a p-type region that causes formation of a depletion region in the waveguide when a bias is not applied to the modulator. The waveguide can be a ridge waveguide and the depletion region can be located in the ridge. In some instances, the n-type region contacts the p-type region.

The phase modulator can include an electrical connection for applying a bias signal to the top of the waveguide and also to a contact region located adjacent to the waveguide and spaced apart from the waveguide. In some instances, the connection for applying a bias signal to the top of the waveguide includes a plurality of contacts spaced apart from one another on the top of the waveguide such that contacts are not positioned over the center of the waveguide. In one example, the electrical contacts include doped polysilicon. The contact region of the phase modulator can include a secondary doped region in contact with the n-type region or the p-type region and can also have a higher carrier concentration than the contacted region.

In some instances, the phase modulator includes a plurality of sub-modulators that are spaced apart from one another along the length of the waveguide. Each of the sub-modulators is connected to a transmission line that carries a bias signal to each of the sub-modulators. The length of the sub-modulators along the waveguide and the spacing between the sub-modulators is selected such that the average speed of the bias signal through the transmission line is about the same as the average speed of a light signal traveling through the waveguide.

One or more of the phase modulators can be included in an intensity modulator such as mach-zehnder interferometer. The intensity modulator can be used with electronics that apply a different bias signal to each of the different modulators. The electronics can provide a delay between the application of the bias signal to different modulators. The delay synchronizes the light signal and the bias signals so each bias signal results in modulation of the same portion of the light signal.

A method of using the phase modulator is also disclosed. The method includes applying a reverse bias to the phase modulator and tuning the reverse bias so as to adjust the size of the depletion region.

DESCRIPTION

Figure 1A:
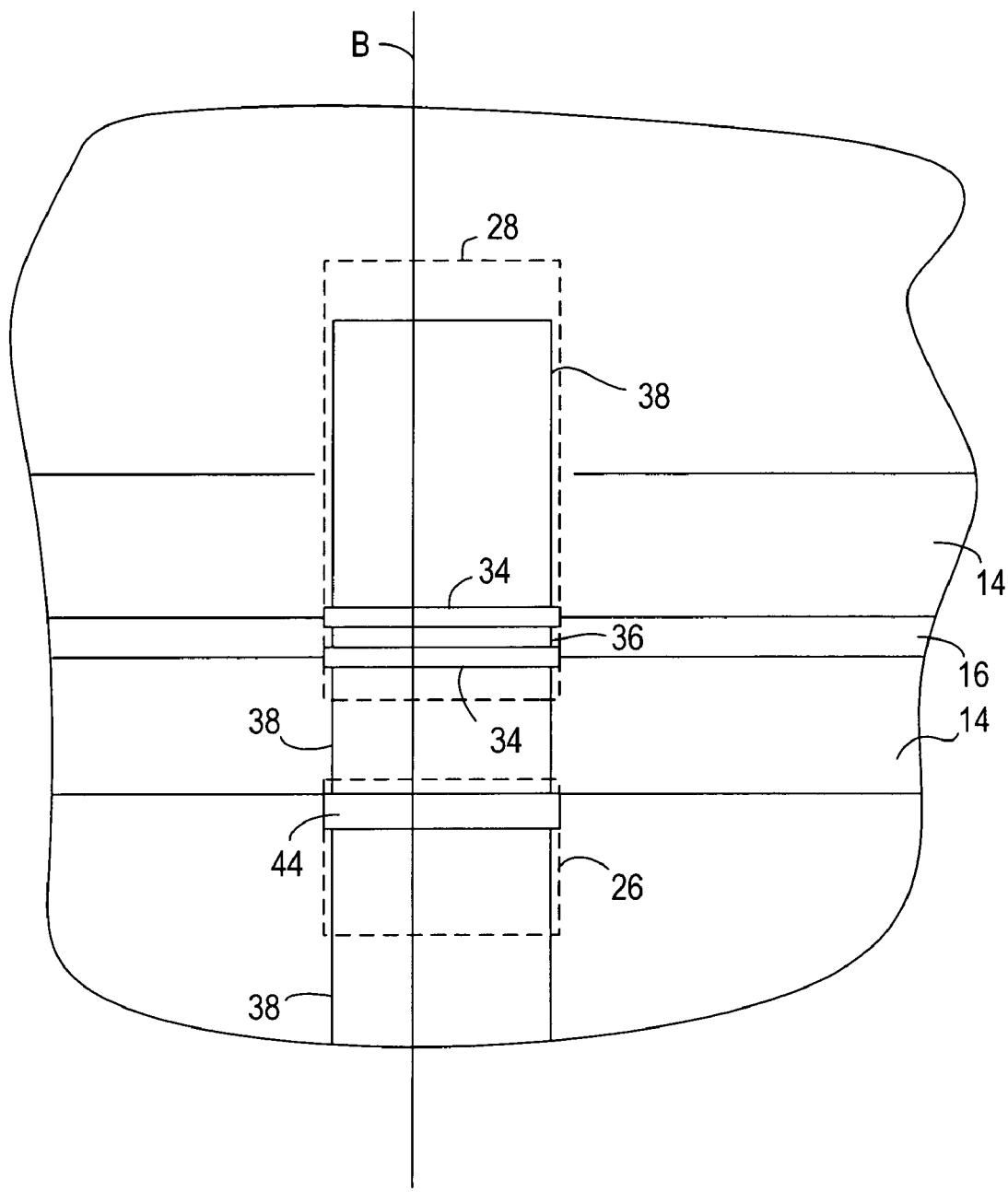
FIG. 1A is a top-view of a portion of an optical device that includes a phase modulator configured to modulate the phase of a light signal traveling along a waveguide. Dashed lined show the location of a first conducting member and a second conducting member. The first conducting member and a second conducting member are treated as transparent to reveal the underlying features.

A phase modulator is disclosed for the modulation of a light signal traveling through a waveguide. The phase modulator includes an n-type doped region and a p-type doped region positioned such that a depletion region is formed in the waveguide when a bias is not applied to the modulator. The modulator is tuned by applying a reverse bias to the modulator. The reverse bias changes the size of the depletion region.

The depletion region has a different index of refraction than the surrounding light transmitting region. As a result, changing the size of the depletion region changes the speed at which the light signal travels through the waveguide. Accordingly, the speed of the light signal through the waveguide can be tuned by tuning the bias level applied to the modulator. Tuning the speed at which the light signal travels through the waveguide allows the modulator to be employed as a phase modulator.

Tuning the phase modulator by changing the size of the depletion region does not require carrier recombination. When the waveguide is a silicon waveguide, carrier recombination can be on the order of $10^4$ times slower than changes in the depletion region. Accordingly, tuning of the depletion region provides a faster method of tuning than is available with modulators that require carrier recombination. Additionally, the use of a silicon waveguide provides a platform that can employ fabrication techniques that are commonly employed with integrated circuit manufacturing. As a result, the modulator is both practical and capable of high-speed modulation.

The phase modulator can be used to provide the modulation in an intensity modulator. For instance, the phase modulator can be configured to modulate the phase of a light signal traveling along a branch of a mach-zehnder interferometer. The increased modulation speed provided by the phase modulator increases the speed of the intensity modulator.

The dopant concentration in the n-type doped region and in the p-type doped region affects the performance of the intensity modulator. For instance, increasing the dopant concentration can cause undesirably high optical loss while decreasing the dopant concentration can require an undesirably long modulator to achieve the desired modulation level. The inventors have found that the optical loss and required length is a strong function of the dopant concentration. As a result, a narrow range of dopant concentrations provides the required balance between modulator length and optical loss. For instance, when the phase modulator is positioned on a branch of a Mach-Zehnder interferometer and the light transmitting medium is silicon, a suitable concentration for the dopant in the n-type region and/or the p-type region is about $10^{16}/cm^3$ to $10^{17}/cm^3$.

In some instances, the phase modulator includes multiple sub-modulators spaced apart from one another along the length of a waveguide. Each sub-modulator is configured to modulate the light signal as it travels along the waveguide. The sub-modulators are each associated with the same transmission lines that carry the bias signal along the length of the phase modulator. The phase modulator is configured such that the bias signal travels through the sub-modulators slower than the light signal travels through the waveguide but travels between the sub-modulators quicker than the light signal travels through the waveguide. The length of the sub-modulators and the spacing between the sub-modulators is selected such that synchronicity between the bias signal and the light signal is substantially retained as the light signal and the bias signal travel through the phase modulator.

In some instance, an intensity modulator includes a plurality of the phase modulators. The use of multiple phase modulators can increase the efficiency of the modulators. For instance, the electrical signal applied to a phase modulator loses energy as it propagates through transmission lines in the phase modulator. The loss in the signal energy reduces the efficiency of a single long phase modulator. When the single-phase modulator is replaced with a plurality of shorter phase modulators, the energy loss that occurs in each of the phase modulators is reduced. As a result, a more efficient result can be achieved with a plurality of smaller phase modulators. For instance, the summed length of the smaller phase modulators can be less than the total length of a single-phase modulator to achieve the same degree of modulation at the same bias level. Additionally or alternately, the shorter modulators can employ a lower bias level to achieve the same degree of modulation that is achieved in the single longer modulator.

Figure 1B:
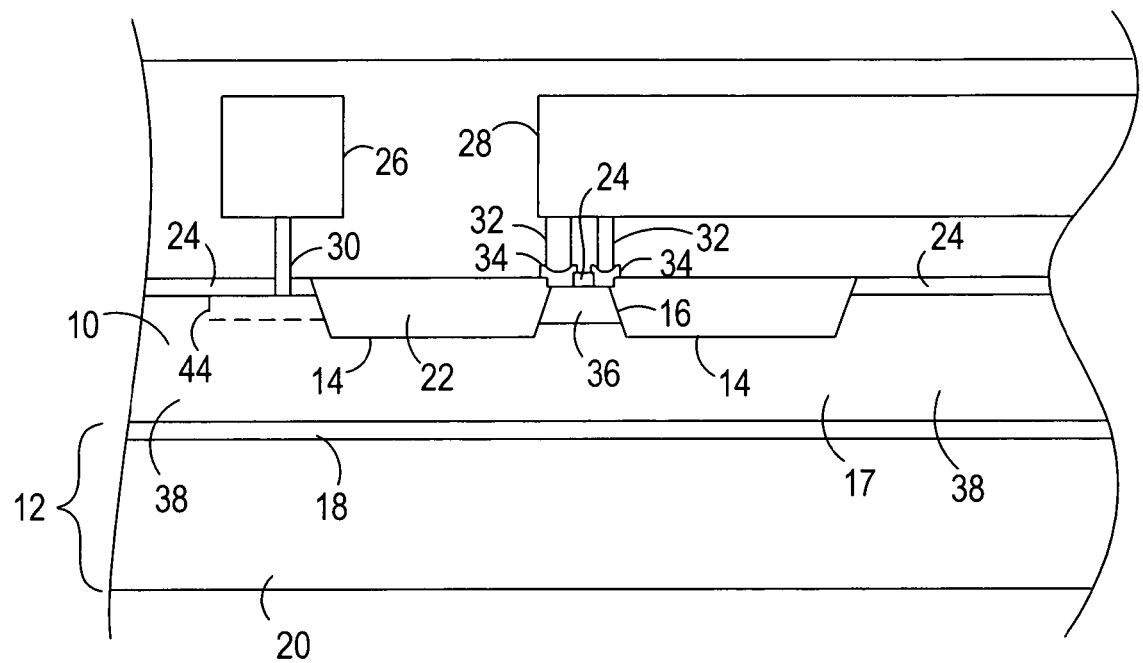
FIG. 1B is a cross section of the optical device illustrated in FIG. 1A taken along the line labeled B.

FIG. 1A and FIG. 1B illustrate an optical device. FIG. 1A is a top-view of the optical device. FIG. 1B is a cross section of the optical device shown in FIG. 1B taken along the line labeled B in FIG. 1A. The device includes a light-transmitting medium 10 positioned on a base 12. A suitable light-transmitting medium 10 includes, but is not limited to, silicon. Recesses 14 are formed in the light-transmitting medium 10 so as to define a ridge 16 extending from a slab 17 of the light-transmitting medium 10. The ridge 16 defines a waveguide where light signals are constrained as they travel through the optical device. The portion of the base 12 adjacent to the light-transmitting medium 10 constrains the light signals to a light signal-carrying region within the waveguide. For instance, the upper surface of the base 12 can have an index of refraction less than the index of refraction of the light-transmitting medium 10. The reduced index of refraction reflects light signals from the light-transmitting medium 10 back into the light-transmitting medium 10.

The base 12 illustrated in FIG. 1B includes an insulator 18 positioned over a substrate 20. When the light-transmitting medium 10 is silicon, a suitable insulator 18 includes, but is not limited to, silica and a suitable substrate 20 includes a silicon substrate. A silicon-on-insulator wafer is a suitable platform for an optical device having a silicon light-transmitting medium 10 positioned over a base 12 having a silica insulator 18 and a silicon substrate 20.

A filler 22 such as a solid or a gas is positioned in the recesses 14. The filler 22 has an index of refraction lower than the index of refraction of the light-transmitting medium 10 in order to constrain the light signals within the ridge 16. The filler can also provide electrical isolation between different regions of the optical device. For instance, the filler can provide electrical isolation between the first doped region and the second doped region, which are discussed in more detail below. When the light-transmitting medium 10 is silicon, a suitable filler 22 includes, but is not limited to, silica. A vacuum can also serve as a suitable filler 22.

An insulating layer 24 is positioned on the light-transmitting medium 10 and the filler 22. The insulating layer is illustrated in FIG. 1B but is not illustrated in FIG. 1A to simplify the illustration. The insulating layer 24 can provide electrical insulation and/or optical confinement. When the light-transmitting medium 10 is silicon, a suitable insulating layer 24 includes, but is not limited to, low K dielectrics such as silica, and/or silicon nitride. In one example, the insulating layer 24 includes a silicon nitride and oxide bi-layer over silicon.

An upper layer is positioned on the insulating layer 24. The upper layer is illustrated in FIG. 1B but is not illustrated in FIG. 1A to simplify the illustration. The upper layer can serve to reduce or prevent capacitive coupling between different components in the device. For instance, the upper layer can prevent or reduce capacitive coupling between a first conducting member 26 and a second conducting member 28 that are disclosed in more detail below. When the light-transmitting medium 10 is silicon, a suitable upper layer includes, but is not limited to, low K dielectrics such as silica.

The phase modulator includes a first conducting member 26 and a second conducting member 28 as is evident in both FIG. 1A and FIG. 1B. In FIG. 1A, the first conducting member 26 and the second conducting member 28 are illustrated by dashed lines and are shown as transparent to permit a view of the underlying features. The first conducting member 26 and the second conducting member 28 can serve as electrodes but more preferably serve as transmission lines. Suitable materials for the first conducting member 26 include, but are not limited to, aluminum, copper and/or their alloys. Suitable materials for the second conducting member 28 include, but are not limited to, aluminum, copper and/or their alloys.

A first electrical connector 30 provides electrical communication between the first member 26 and a contact portion of the slab 17 located adjacent to the waveguide and spaced apart from the waveguide. Second electrical connectors 32 provide electrical communication between contacts 34 at the top of the ridge 16 and the second member 28. The first electrical connector 30 and the second electrical connectors 32 are illustrated in FIG. 1B but are not illustrated in FIG. 1A to simplify the illustration. The first electrical connectors, the second electrical connectors and the contacts provide electrical connections between electronics and the optics. Suitable materials for the first electrical connector 30 include, but are not limited to, tungsten, aluminum, copper and/or their alloys. Suitable materials for the second electrical connector 32 include, but are not limited to, tungsten, aluminum, copper and/or their alloys. Suitable materials for the contacts 34 include, but are not limited to, Al—Si alloys, Ti silicide, and Co silicide.

In some instances, the contacts 34 are a doped non-metal such as doped silicon or doped polysilicon. Doped polysilicon can provide the required electrical conduction but can have about two orders of magnitude fewer carriers than the metal. Because increased carrier content is associated with increased light absorption, contacts 34 constructed from doped silicon can be associated with reduced levels of optical loss relative to metals. As a result, contacts 34 constructed of doped silicon or polysilicon may be desired when low levels of optical loss are desired. When the contacts 34 are made of polysilicon, a suitable concentration of the dopant includes, but is not limited to, concentrations of about $10^{18}/cm^3$ to $2 \times 10^{21}/cm^3$ or $10^{19}/cm^3$ to $2 \times 10^{20}/cm^3$.

The light-transmitting medium 10 is doped so as to have a first doped region 36 and a second doped region 38. When the first doped region 36 is an n-type region, the second dope region is a p-type region. When the first doped region 36 is a p-type region, the second dope region is an n-type region. In some instances, the first doped region is preferably an n-type region and the second doped region is preferably a p-type region. For instance, certain fabrication techniques may permit easier formation of a p-type region deeper in the light transmitting medium that an n-type region. When the contacts 34 are formed of a doped non-metal, the non-metal is doped with the same type of dopant as the first doped region 36 but can be at a higher dopant concentration than the first doped region 36.

The first doped region 36 and the second doped region 38 are positioned sufficiently close to one another that a depletion region 40 forms between the n-type region and the p-type region when a bias is not applied to the phase modulator. For instance, FIG. 1B illustrates the n-type region in contact with the p-type region. Contact between the n-type region and the p-type region may not be necessary although it can increase the efficiency of the modulator. The resulting interface is substantially parallel to the top of the ridge 16 and/or the base 12 and is positioned in the ridge 16.

Figure 1C:
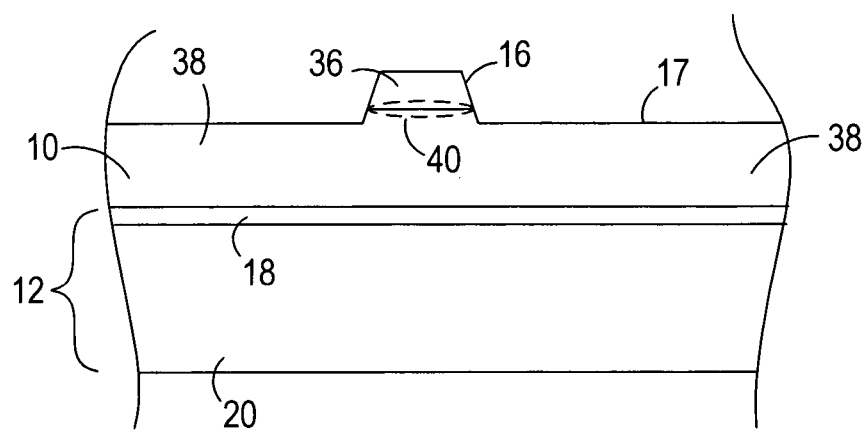
FIG. 1C illustrates the formation of a depletion region formed in the waveguide of FIG. 1A as a result of the proximity between doped regions.

The depletion region 40 results from a migration of carriers between the n-type region and the p-type region until a potential forms that prevents additional migration. This migration results in a lack of carriers in the depletion region. For instance, the depletion region 40 has a carrier concentration of less than about $1 \times 10^{15}/cm^3$. The n-type region and a p-type region are positioned so the depletion region 40 is positioned in the light signal-carrying region of the waveguide. For instance, FIG. 1C illustrates the depletion region 40 that forms from the doped region configuration illustrated in FIG. 1B. A suitable concentration of carriers in the p-type region includes values greater than $1 \times 10^{15}/cm^3$, $1 \times 10^{16}/cm^3$, $3.5 \times 10^{16}/cm^3$, or $5.0 \times 10^{17}/cm^3$. A suitable value for the concentration of carriers in the n-type region includes values greater than $1 \times 10^{15}/cm^3$, $2 \times 10^{16}$, $5 \times 10^{16}$, and $1 \times 10^{18} cm^{-3}$.

A secondary doped region 44 is formed at the contact portion of the slab 17. The secondary doped region 44 can contact the adjacent doped region and can include the same type of dopant as the adjacent doped region. For instance, in FIG. 1B, the underlying doped region is the second doped region 38. Accordingly, when the phase modulator is constructed as illustrated in FIG. 1B, the secondary doped region 44 can contact the second doped region and has a dopant type that is the same as the second doped region 38. The secondary doped region 44 can have a higher dopant concentration than the adjacent doped region. For instance, the dopant concentration in the secondary doped region 44 can be more than 10 times the dopant concentration in the adjacent doped region or more than 1000 times the dopant concentration in the adjacent doped region. The elevated dopant concentration reduces the contact resistance of the phase modulator and accordingly provides an increased modulation speed. Suitable concentrations for the dopant in the secondary doped region 44 include, but are not limited to, concentrations greater than $1 \times 10^{18}/cm^3$, $1 \times 10^{19}/cm^3$, $5 \times 10^{19}/cm^3$, $1 \times 10^{20}/cm^3$. Increasing the dopant concentration can increase the amount of optical loss. As a result, the secondary doped region 44 is positioned remote from the light signal-carrying region in order to reduce optical loss resulting from the increased dopant concentration. For instance, the secondary doped region 44 is positioned on a portion of the slab 17 adjacent to the recess 14. This location can reduce interaction between a light signal in the waveguide and the secondary doped region 44. In some instances, the secondary doped region 44 can be positioned in the recess 14 or in the bottom of the recess 14.

Figure 1D:
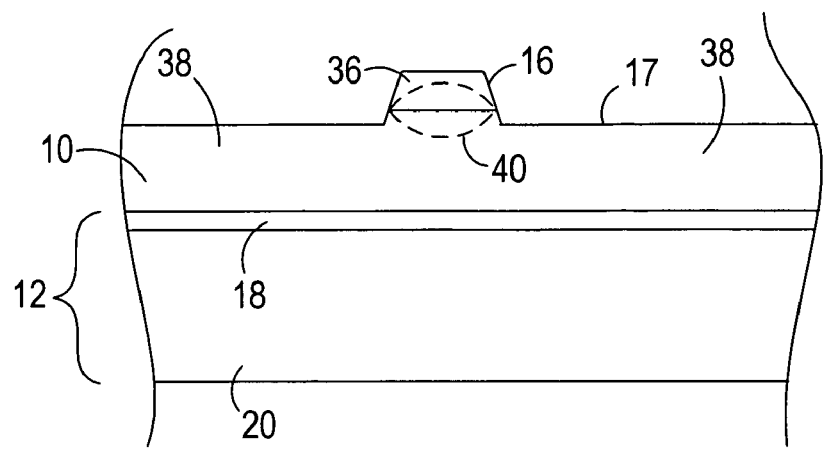
FIG. 1D illustrates the effect on the depletion region of applying a reverse bias applied to the phase modulator.

The first member 26 and the second member 28 are connected to electronics (not shown) that can apply a bias between the first conducting member 26 and the second conducting member 28. Accordingly, a bias is formed between the top of the ridge 16 and the contact portion of the slab 17. The bias can be a reverse bias. Changing the level of bias changes the size and/or shape of the depletion region. For instance, increasing the reverse bias can increase the size of the depletion region. As an example, FIG. 1D illustrates the depletion region of FIG. 1C after an increased reverse bias has been applied to the phase modulator. FIG. 1B, FIG. 1C and FIG. 1D illustrate the first doped region and the second doped region occupying the entire light signal carrying region. This arrangement can provide an increased potential tuning efficiency.

The depletion region 40 has a different index of refraction than the light transmitting region located adjacent to the depletion region. For instance, when the light-transmitting medium 10 is silicon, the depletion region 40 has a higher index of refraction than that of the surrounding silicon. As a result, the depletion region 40 slows the light signal as the light signal travels through the depletion region. As a result, increasing the size of the depletion region 40 further slows the speed at which the light signal travels through the waveguide. Accordingly, the speed of the light signal through the waveguide can be tuned by tuning the bias level. Additionally, because this phase tuning is based on tuning of the depletion region, tuning of the phase modulator does not involve carrier re-combination. Carrier recombination is on the order of 1000 times slower than changes in the depletion region. Accordingly, the phase modulator can be on the order of 1000 to 10000 times faster than phase modulators that require carrier recombination.

A forward bias can be applied to the phase modulator. The forward bias will shrink the size of the depletion region. Accordingly, when the light-transmitting medium 10 is silicon, increasing the forward bias can accelerate the light signal. However, once the forward bias rises above a threshold, the forward bias can result in current flow that requires recombination as the forward bias drops toward the threshold. Because tuning that requires recombination is slower than tuning of the depletion region, it may not be desirable to use the forward bias above levels where significant current flow occurs.

The concentration of the dopants in the doped regions influences the performance of the phase modulator. For instance, the dopants can cause light absorption. As a result, increasing the dopant level can cause undesirably high levels of optical loss. Decreasing the dopant level can reduce the tuning efficiency by requiring a higher bias level to achieve the same level of phase modulation. As a result, when the dopant level is reduced, the length of the phase modulator must be increased to provide the desired level of phase modulation for a give bias level. Suitable dopants for the n-type region include, but are not limited to, phosphorus and/or arsenic. Suitable dopants for the p-type regions include, but are not limited to, boron.

Although FIG. 1B illustrates the interface between the first doped region 36 and the second doped region 38 as being positioned in the ridge 16, first doped region 36 and the second doped region 38 can be constructed so the interface is below the ridge 16. In these instances, the doped region in the ridge 16 and the secondary doped region 44 may be the same type of doped region. For instance, the doped region in the ridge 16 and the secondary doped region 44 may both be an n-type region or they may both be a p-type region.

The waveguide can be dimensioned so as to be a single-mode waveguide or a multi-mode waveguide. An example of a single mode waveguide has a ridge 16 with a height of about 0.55 μm, a distance of about 0.5 μm from the top of the ridge 16 to the interface between the first doped region 36 and the second doped region 38, a height of about 1.4 μm from the top of the ridge 16 to the base, and a top of the ridge 16 width of about 1.4 μm.

Figure 2A:
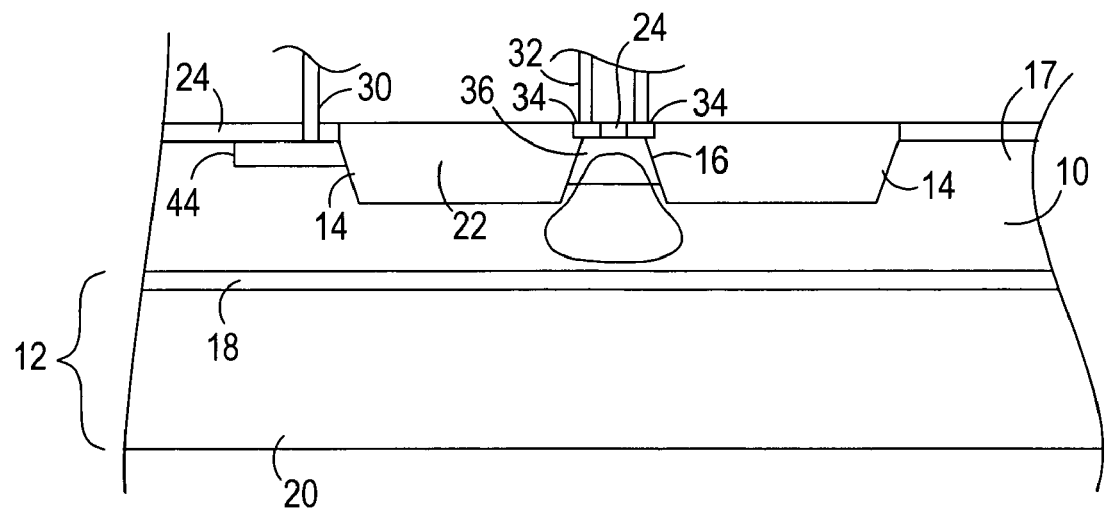
FIG. 2A illustrates the electrical contacts and a waveguide associated with a phase modulator. The relationship between the contacts and the fundamental mode of a light signal traveling through the waveguide is shown.

The phase modulator construction of FIG. 1A and FIG. 1B shows the contacts 34 at the corners of the ridge 16 and spaced apart. For instance, the contacts 34 do not extend all the way across the top of the ridge 16. FIG. 2A shows the profile of the fundamental mode of a light signal traveling along the waveguide. The position of the contacts 34 reduces the interaction between the contacts 34 and the light signal. For instance, positioning the contacts 34 at the edge of the ridge 16 provides a larger distance between the profile and the contacts 34 than would occur if the contacts 34 were positioned over the center of the ridge 16. As a result, the positioning of the contacts 34 can reduce the optical loss resulting from absorption by the contacts 34. As noted above, the contacts 34 can also be constructed of a doped non-metal in order to further reduce the light absorption.

Figure 2B:
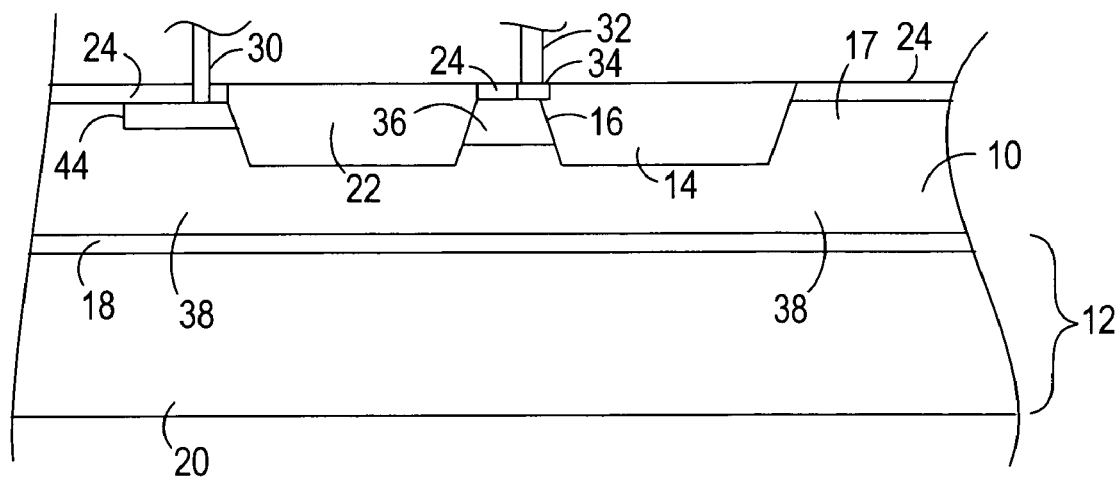
FIG. 2B and FIG. 2C illustrate alternate arrangements for the electrical contacts and waveguides of the phase modulator.

Although two contacts 34 are illustrated, can include a single one of the contacts 34 as illustrated in FIG. 2B. The use of the single contact 34 can further reduce the amount of optical loss associated with the contact 34. Although the contact 34 is shown positioned on the corner of the ridge 16 that is furthest from the secondary doped region 44, the contact 34 can be positioned on the corner of the ridge 16 that is closes to the secondary doped region 44.

Figure 2C:
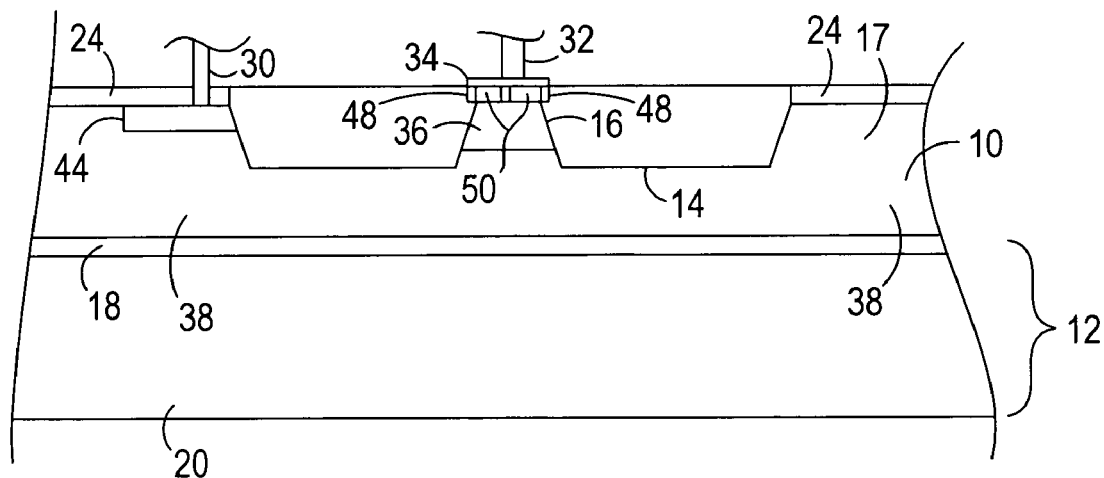

FIG. 2C is a cross section of the optical device showing an alternate construction of the interface between the waveguide and the contacts 34. Conductors 48 are positioned on top of the ridge 16 and are spaced apart from one another. Spacers 50 are positioned between the conductors 48. The spacers 50 can have an index of refraction that is less than the index of refraction of the light-transmitting medium 10. The reduced index of refraction effectively pushes the fundamental mode into the waveguide and away from the contact 34. The push of the fundamental mode away from the contact 34 reduces the amount of light absorbed by the contact 34. As a result, the contact 34 can be a metal without the high absorption levels associated with metal contacts 34. As noted above, the contact 34 can be a doped non-metal. Suitable materials for the conductors 48 include, doped silicon. When the light-transmitting medium 10 is silicon, a suitable material for the conductors includes, silicon, polysilicon, doped silicon and doped polysilicon.

When the interface between the waveguide and the contact(s) 34 is constructed in accordance with FIG. 2C, increasing the portion of the ridge 16 top width that contacts a conductor can reduce the resistance of the interface. Reducing this resistance can increase the speed of the phase modulator.

Figure 3A:
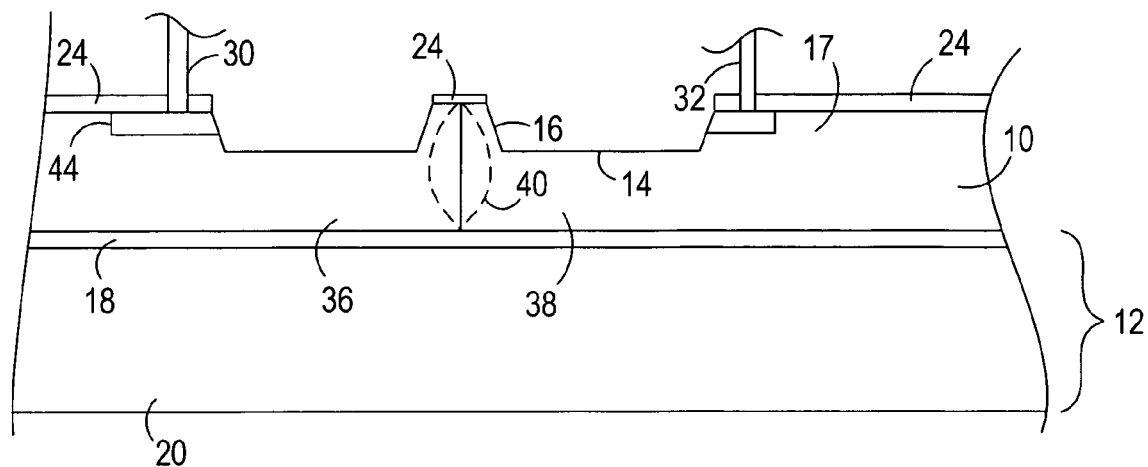
FIG. 3A is a cross section of a phase modulator having contact regions positioned on opposing sides of a ridge waveguide.

Although the embodiment of the phase modulator illustrated in FIG. 1A and FIG. 1B is configured to apply a potential difference between the top of the ridge 16 and a location adjacent to the ridge 16. The phase modulator can be configured such that the potential is formed between opposing sides of the ridge 16. For instance, FIG. 3A illustrates an embodiment of the phase modulator where contact regions are positioned on opposing sides of the ridge 16. For instance, the secondary doped regions 44 are positioned on opposing sides of the ridge 16. Accordingly, the phase modulator is operated by applying a bias between opposing sides of the ridge 16. The first doped region 36 and the second doped region 38 are formed so a depletion region 40 is formed in the ridge 16. For instance, the first doped region 36 and the second doped region 38 are formed so as to have a substantially vertical interface positioned within the ridge 16.

In some instances, the phase modulator embodiment of FIG. 1A provides higher speed performance relative to the embodiment of FIG. 3A. The positioning of both contact regions on opposing sides of the ridge 16 can increase the distance between the contact regions and can accordingly increase the resistance associated with the phase modulator. This increase in resistance can slow the performance of the phase modulator.

Figure 3B:
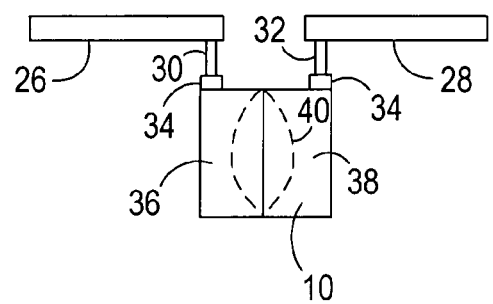
FIG. 3B is a cross section of a phase modulator having contacts positioned on the opposing edges of a channel waveguide.

The phase modulator can be adapted to other waveguide types. For instance, FIG. 3B illustrates the phase modulator employed in conjunction with a channel waveguide. The first doped region 36 and the second doped region 38 are formed so a depletion region 40 is formed in the waveguide. For instance, the first doped region 36 and the second doped region 38 are formed so as to have a substantially vertical interface positioned within the waveguide. The resulting depletion region 40 is also positioned in the waveguide. The contacts 34 are positioned at the upper edges of the waveguide. As a result, the phase modulator is operated by applying a bias between the upper edges of the waveguide.

Figure 4B:
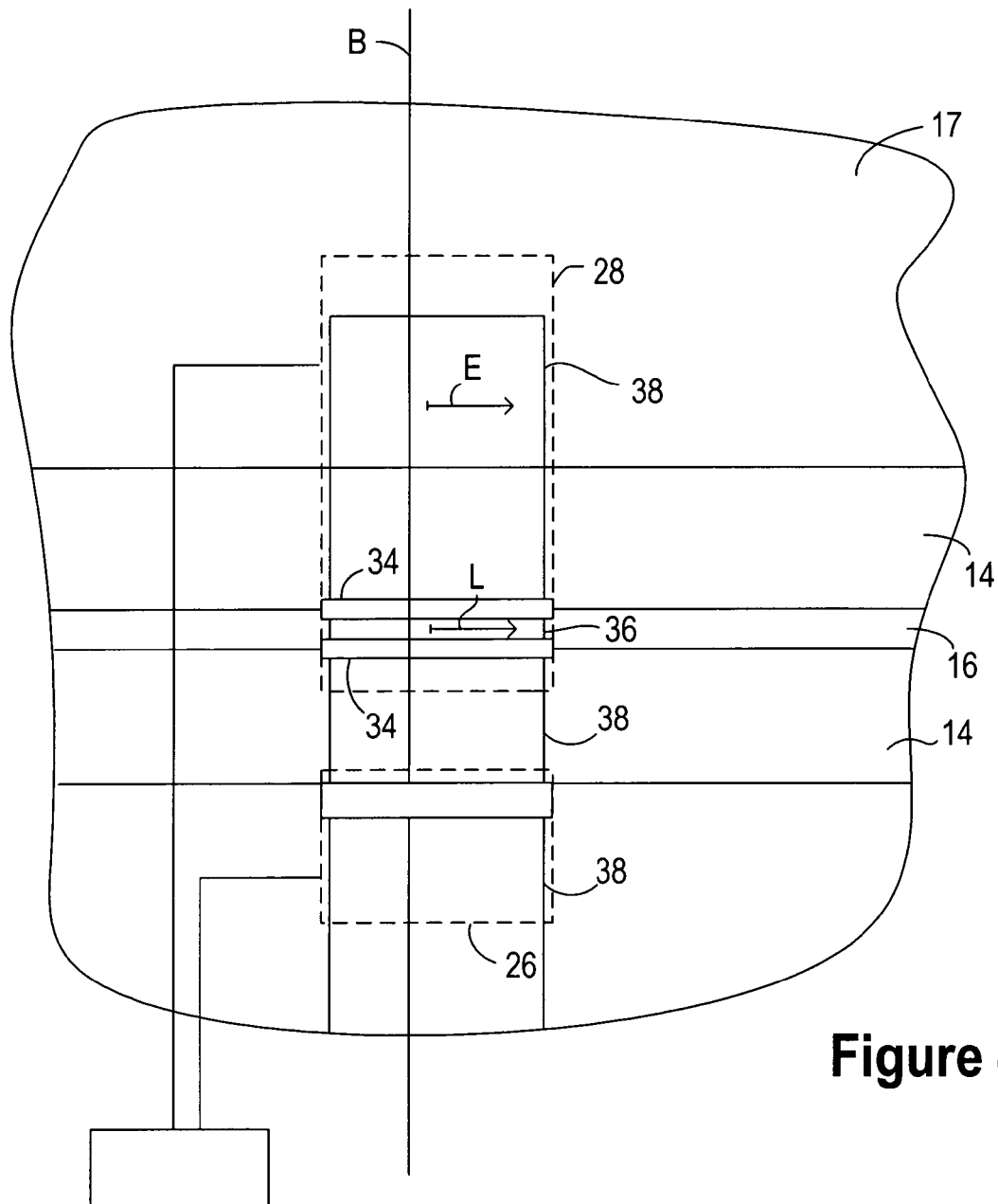
FIG. 4B is a top-view of a phase modulator configured to modulate the phase of a light signal traveling along a branch of an intensity modulator.
Figure 4A:
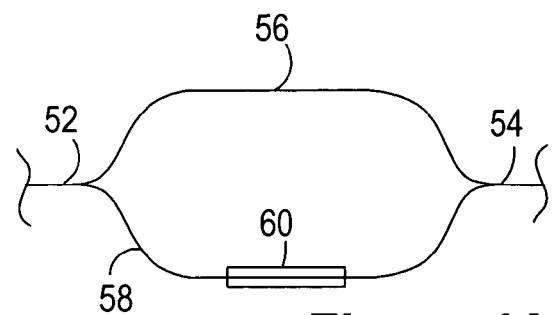
FIG. 4A illustrates a phase modulator included in an intensity modulator. The illustrated intensity modulator is a mach-zehnder interferometer.

FIG. 4 illustrates above phase modulator employed in a mach-zehnder interferometer to provide a high-speed intensity modulator. The intensity modulator includes an input waveguide 52, an output waveguide 54, a first branch 56, and second branch 58. The phase modulator 60 is positioned along the second branch 58. During operation of the intensity modulator, a light signal travels along the input waveguide 52. A first portion of the light signal enters the first branch 56 and a second portion of the light signal enters the second branch 58. The first portion of the light signal and the second portion of the light signal then re-combine at the output waveguide 54. The phase modulator is operated so as to tune the phase of the second portion of the light signal relative to the first portion of the light signal. When the first portion of the light signal and the second portion of the light signal enter the output waveguide 54 in phase, there is high intensity output from the intensity modulator. When the first portion of the light signal and the second portion of the light signal are out of phase by π, there is low intensity output from the intensity modulator. Accordingly, the intensity modulator can be switched between the low intensity output and the high intensity output by operating the phase modulator to create a π phase difference or zero phase difference.

In some instances, it is desirable for an intensity modulator such as a Mach-Zehnder interferometer to provide intensity modulation on the order of 10 to 40 Gbit/s with low levels of optical loss. Accordingly, the high-speed features of the phase modulator can be important when the phase modulator is employed for intensity modulation. Additionally, the low optical loss features of the phase modulator can also become desirable when the phase modulator is employed for intensity modulation.

FIG. 4B is a top-view of a phase modulator constructed according to FIG. 1A employed in conjunction with a branch waveguide of a Mach-Zehnder interferometer. In FIG. 4B the first conducting member 26 and the second conducting member 28 are illustrated by dashed lines and are shown as transparent to permit a view of the underlying features. Additionally, the first electrical connector, the second electrical connectors, the insulating layer, and upper layer are not illustrated in FIG. 4B to simplify the illustration.

The concentration of the dopants in the first doped region 36 and the second doped region 38 of the phase modulator influences the performance of the intensity modulator. For instance, the dopants can absorb the light signal. As a result, increasing the dopant level can cause undesirably high levels of loss. Decreasing the dopant level can reduce the tuning efficiency. As a result, the length of the phase modulator must be increased to provide the desired level of tuning. For instance, it may be desirable for the phase modulator to provide a π phase shift. Increasing the phase shift to this magnitude can require a phase modulator with an increased length. As a result, decreasing the dopant concentration can result in the phase modulator being impractically long to be effective in a Mach-Zehnder interferometer. Accordingly, when the phase modulator is included in an intensity modulator, the dopant concentration in the first phase and the second phase must be chosen to achieve a balance achieved between the length of the phase modulator and the optical loss caused. When the phase modulator is positioned on a branch of a Mach-Zehnder interferometer and the light-transmitting medium 10 is silicon, a suitable concentration for the dopant in the n-type region about $10^{15}/cm^3$ to $10^{18}/cm^3$ and more preferably $10^{16}/cm^3$ to $10^{17}/cm^3$. When the phase modulator is positioned on a branch of a Mach-Zehnder interferometer and the light-transmitting medium 10 is silicon, a suitable concentration for the dopant in the p-type region about $10^{15}/cm^3$ to $10^{18}/cm^3$ and more preferably $10^{16}/cm^3$ to $10^{17}/cm^3$.

Electronics 64 are configured to apply an electrical signal to the first member 26 and the second member 28. The electrical signal establishes the desired bias between the first member 26 and the second member 28. The electronics are configured to apply the electrical signal to one end of the first member 26 and the second member 28. As a result, the first member 26 and the second member 28 act as transmission lines that carry the electrical signal along the length of the first member 26 and the second member 28. For instance, the arrow labeled E in FIG. 4B illustrates the direction which the electrical signal propagates through the second member 28. The arrow labeled L illustrates the direction which the light signal propagates through the waveguide. As is evident in FIG. 4B, the light signal and the electrical signal travel substantially parallel to one another. The light signal and the electrical signal can travel at about the same speed. As a result, the electrical signal continues to operate on the same portion of the light signal as they both travel through the phase modulator. In some instances, similar propagation speeds between the light signal and the electrical signal can be achieved by changing the dimensions of the first member 26 and/or the dimensions of the second member 28 to influence the propagation speed of the electrical signal.

Figure 5A:
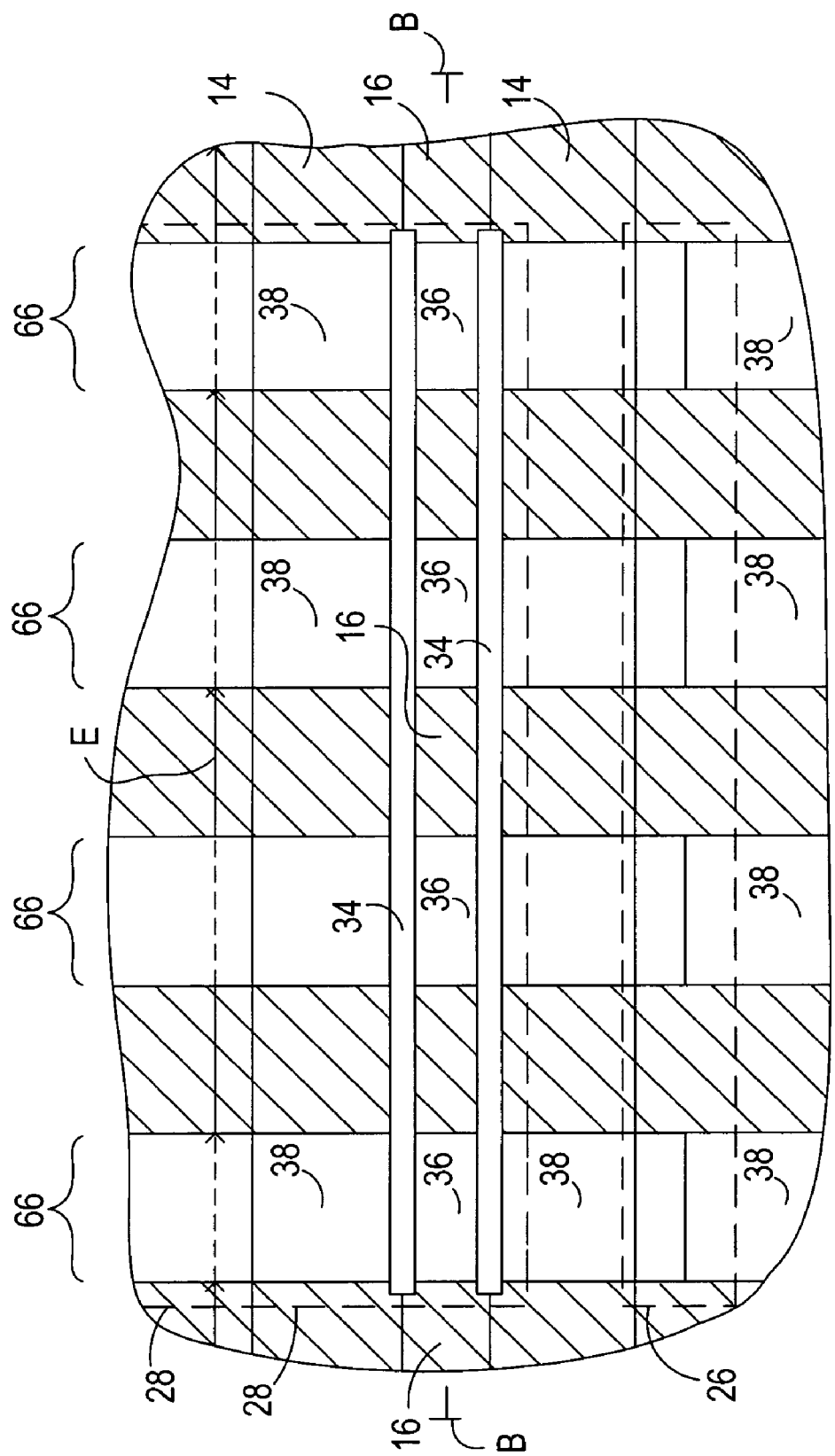
FIG. 5A is a top-view of a phase modulator that includes a plurality of sub-modulators that are spaced apart from one another. The sub-modulators are all associated with one pair of transmission lines.
Figure 5B:
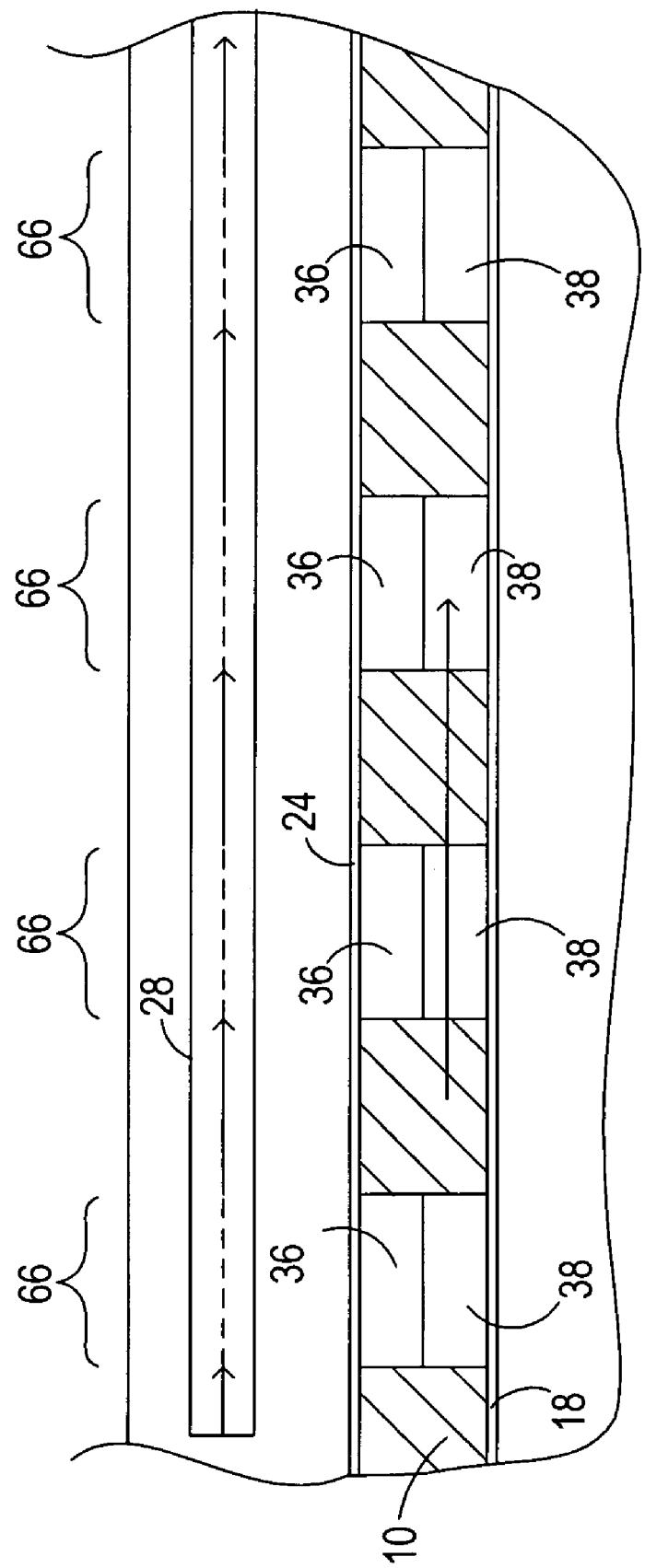
FIG. 5B is a cross section of the modulator of FIG. 5A taken along a line extending between the brackets labeled B in FIG. 5A.

The phase modulator can include a plurality of sub-modulators 66 as illustrated in FIG. 5A and FIG. 5B. FIG. 5A is a top-view of the phase modulator and FIG. 5B is a cross section of the phase modulator taken along the longitudinal axis of the waveguide in FIG. 5A. For instance, FIG. 5B is a cross section of the phase modulator taken along a line extending between the brackets labeled B in FIG. 5A. In FIG. 5A the first conducting member 26 and the second conducting member 28 are illustrated by dashed lines and are shown as transparent to permit a view of the underlying features. Additionally, the first electrical connector 30, and the second electrical connectors 32 are not illustrated in FIG. 5A to simplify the illustration. The repeat diagonal lines in FIG. 5A illustrate the locations of undoped light-transmitting medium 10.

The illustrated portion of the phase modulator includes four sub-modulators 66 that are each associated with a first member 26 and a second member 28. Each sub-modulator 66 includes a different pair of doped regions. For instance, each sub-modulator 66 includes a first doped region 36 and a second doped region 38. Accordingly, an electrical signal placed on the first member 26 and the second member 28 can provide modulation of a light signal at each of the sub-modulators 66.

The electrical signal propagates through the first member 26 as illustrated by the arrow labeled E. The dashed portions of the arrow indicate when the electrical signal is passing through a sub-modulator 66 and the unbroken portions of the arrow indicate when the electrical signal passing between sub-modulators 66. The electrical signal travels faster when it is traveling between sub-modulators 66 than when the light signal is traveling through a sub-modulator 66. As a result, the length of the sub-modulators 66 and the separation between the sub-modulators 66 can be selected to control the time required for the electrical signal to propagate the length of the first member 26 and the second member 28.

It can become necessary to control the time for an electrical signal to propagate through the phase modulator as the length of the modulator increases. For a give bias between the first member 26 and the second member 28, the time for which the light signal is exposed to the electrical signal must be increased in order to increase the phase differential caused by the phase modulator. In order to achieve a π phase differential, the first member 26 and the second member 28 often must have a length on the order of several centimeters in length. This length can emphasize the difference between the propagation speed of the light signal and the electrical signal. The sub-modulators 66 can be arranged to reduce the effects of the speed differential. For instance, the electrical signal travels through the first member 26 faster than the light signal travels through the waveguide when the electrical signal is between sub-modulators 66, the light-transmitting medium 10 is silicon, and the first member 26 and the second member 28 are aluminum. However, under these same conditions, the electrical signal travels through the first member 26 more slowly than the light signal travels through the waveguide when the electrical signal is traveling through a sub-modulator 66.

Under the conditions described above, the sub-modulators 66 can be configured to passively preserve synchronize between the electrical signal and the light signal as these signals travel through the phase modulator. For instance, the sub-modulators 66 can be configured such that the electrical signal and the light signal are synchronized when they enter the first sub-modulator 66 but that the electrical signal begins to lag the light signal as they travel through the sub-modulator 66. The spacing between the sub-modulators 66 can then be selected so the electrical signal catches back up to the light signal or passes the light signal before both signals enter the next sub-modulator 66. As a result, the length and spacing of the sub-modulators can be selected such that the average speed of the light signal through the waveguide and the average speed of the electrical signal through the transmission line are about the same. As an example, the length and spacing of the sub-modulators can be selected such that the average speed of the light signal through the phase modulator is equal to the average speed of the electrical signal through the phase modulator +/−0.1%, +/−1%, +/−10%, or +/−40%. As a result, the bias signal modulates substantially the same portion of the light signal as the light signal and the bias signal travel through the phase modulator.

The number, configuration, and spacing of the sub-modulators 66 in the phase modulator can be selected to control the degree of synchronicity between the electrical signal and the light signal. Reducing the length of the sub-modulators 66 can increase the number of sub-modulators 66 that are needed to achieve a particular degree of modulation. However, shorter sub-modulators 66 reduce the lag between the electrical signal and the light signal. Additionally, less distance is required between shorter sub-modulators 66 in order to return synchronicity between the light signal and the electrical signal. As a result, reducing the sub-modulator 66 length can increase the synchronicity between the electrical signal and the light signal.

In some instances, the dimensions of the first member and the second member can also be changed to influence the speed of the electrical signal through the phase modulator. For instance, the thickness of the first member and/or the second member can be changed to tune the propagation speed of the electrical signal through the phase modulator.

A suitable sub modulator spacing ratio (average length of the sub modulators: the average spacing between the sub-modulators 66) is in a range of 100:1 to 1:100, 1:10 or 10:1, 0.2:1 to 2:1. When the light-transmitting medium 10 is silicon, a preferred sub modulator spacing ratio is in a range of 100:1 to 1:100.

Figure 6:
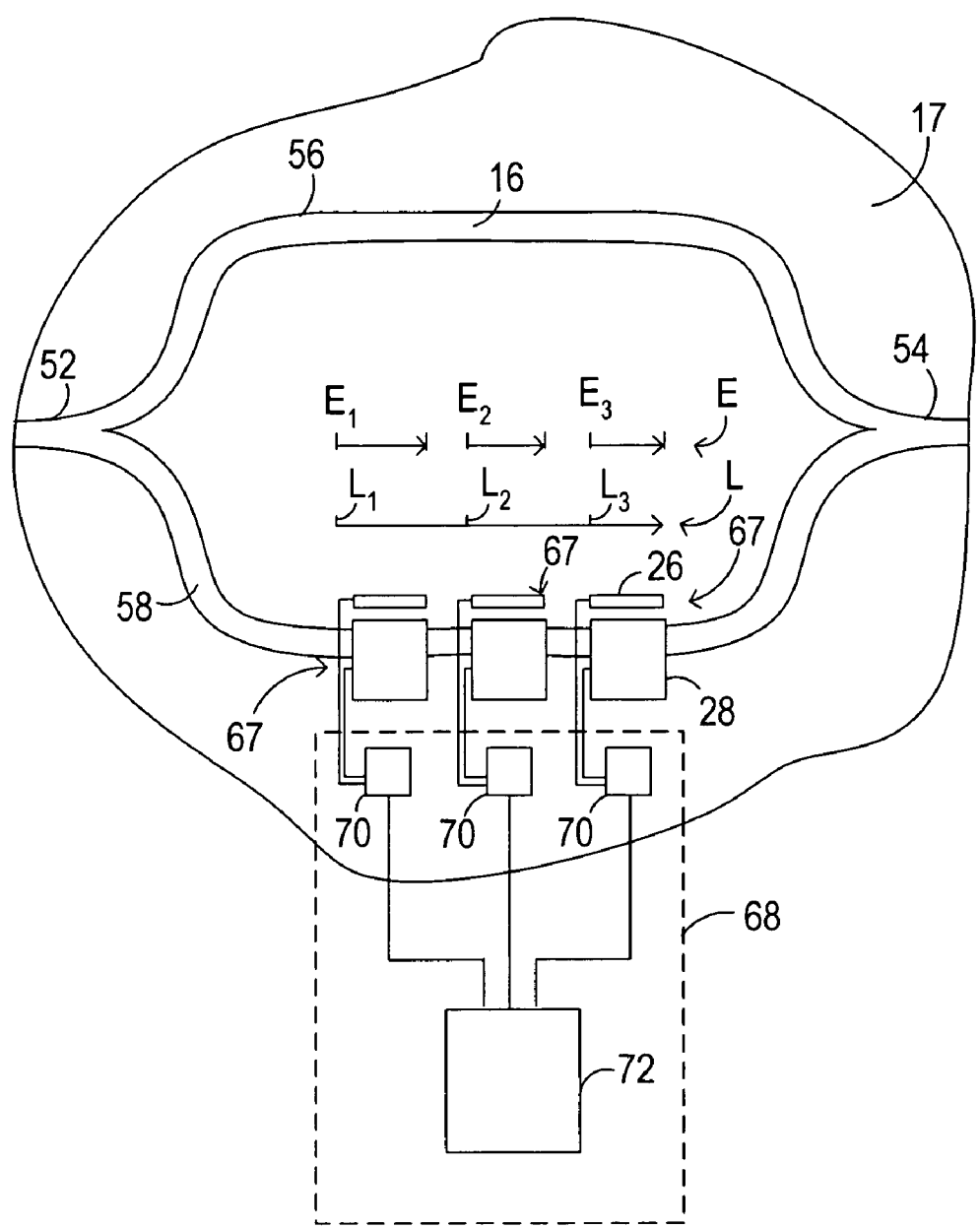
FIG. 6 includes a top-view of an intensity modulator that includes a plurality of phase modulators.

An intensity modulator can include a plurality of the phase modulators as illustrated in FIG. 6. FIG. 6 is a top-view of a portion of an optical device. The optical device includes a mach-zehnder interferometer configured to serve as an intensity modulator. A plurality of the phase modulators 67 are positioned along a branch of the interferometer. Each phase modulator can include a single sub-modulator 66 or a plurality of sub-modulators 66 as illustrated in FIG. 5A. Each phase modulator is in electrical communication with device control electronics 68. The device control electronics 68 include a plurality of device drivers 70 that are each in electrical communication with an associated phase modulator. A controller 72 is in electrical communication with the device drivers 70.

During operation of the device, the device drivers 70 apply the electrical signal to the associated phase modulator. The controller 72 is configured to control the timing at which the electrical signal is applied to each phase modulator. For instance, the device control electronics 68 create a delay between when the electrical signal is applied to each phase modulator so the electrical signals are synchronized with the light signal traveling through the waveguide. FIG. 6 illustrates this synchronization. As a light signal travels through the waveguide, the longitudinal location of a particular segment of the light signal is shown at times labeled $L_1$, $L_2$ and $L_3$. The light signal is modulated by three electrical signals labeled $E_1$, $E_2$, and $E_3$. The device control electronics 68 apply the electrical signal $E_1$ at the time labeled $L_1$, the electrical signal $E_2$ at the time labeled $L_2$, and the electrical signal labeled $E_3$ at the time labeled $L_3$. As a result, the electrical signals labeled $E_1$, $E_2$, and $E_3$ each modulate the same portion of the light signal. Accordingly, the effects of $E_1$, $E_2$, and $E_3$ add up to provide the total modulation for that portion of the light signal.

Additionally, the device control electronics 68 can be configured to determine the electrical signal that must be applied to each phase modulator in order to achieve the desired degree of modulation. For instance, the electrical signals $E_1$, $E_2$, and $E_3$ can be the same or different. The device control electronics 68 can determine what combination of electrical signals electrical signals $E_1$, $E_2$, and $E_3$ will provide the desired result. For instance, if the intensity modulator is used as a digital modulator and the target portion of the light signal is to show a "1" (as opposed to a zero), the device control electronics can identify and/or apply the combination of $E_1$, $E_2$, and $E_3$ needed to produce a "1."

Suitable device control electronics 68 include, but are not limited to, firmware, hardware and software or a combination thereof. Examples of suitable control electronics include, but are not limited to, analog electrical circuits, digital electrical circuits, processors, microprocessors, digital signal processors (DSPs), computers, microcomputers, ASICs, and discrete electrical components, or combinations suitable for performing the required control functions. In some instances, the control electronics includes a memory that includes instructions to be executed by a processing unit during performance of the control and monitoring functions.

The electrical signal applied to a phase modulator loses energy as it propagates through the first member 26 and the second member 28. The loss in the signal energy reduces the efficiency of a single long phase modulator. When the single long phase modulator is replaced with a plurality of shorter phase modulators, the energy loss that occurs in each of the phase modulators is reduced. As a result, a more efficient result can be achieved with a plurality of smaller phase modulators. A suitable length of the first member 26 and the second member 28 is less than 1 cm, 1 mm or 100 um. When the modulators are included in an intensity modulator having silicon waveguides, a suitable length of the first member 26 and the second member 28 is in a range of 0.1 mm to 1 cm. As a result, a suitable length for a modulator included in an intensity modulator having silicon waveguides is in a range of 1 mm to 10 cm.

Although the intensity modulator of FIG. 6 is shown with three phase modulators, the intensity modulator can include one phase modulator, two phase modulators, or four or more phase modulators. Although the device drivers 70 are shown as being positioned on the optical device, the device drivers 70 can be positioned off the optical device. Additionally, the device drivers 70 need not be independent of the controller 72 and can be integrated into the controller 72.

FIG. 7A through FIG. 7E illustrate a method of forming an optical device that includes the phase modulator. The method can be performed on a wafer having a light-transmitting medium positioned on a base. An example of a suitable wafer includes, but is not limited to, a silicon-on-insulator wafer.

The material for the insulating layer 24 is deposited on the wafer. For instance, when the insulating layer 24 is to be constructed from a layer of silicon nitride over a layer of silica, a layer of silica can be formed on the wafer followed by formation of a layer of silicon nitride. A suitable method of forming the layer of silica on a layer of silicon includes, but is not limited to thermal growth. A suitable method of forming the layer of silicon nitride includes, but is not limited to, deposition techniques such a low-pressure chemical vapor deposition (LPCVD).

The insulating layer 24 is patterned such that the location where the waveguide ridge 16 is to be formed is protected and the recesses 14 are exposed. A suitable method of patterning the insulating layer 24 includes, but is not limited to, photolithography and etching. The result is then etched so as to generate the device precursor illustrated in FIG. 7A.

The doped regions can be formed before or after formation of the insulating layer 24 on the device precursor. Suitable methods for forming the doped regions include, but are not limited to, ion implantation, or diffusion. In some instance, one or more regions of the optical device are masked during the formation of a doped region(s). The mask can protect the one or more regions from the dopant. Suitable masks for use during formation of the doped regions include, but are not limited to photoresist, and oxide. The doped regions are not illustrated in FIG. 7A through FIG. 7E in an effort to simplify the illustrations.

Figure 7A:
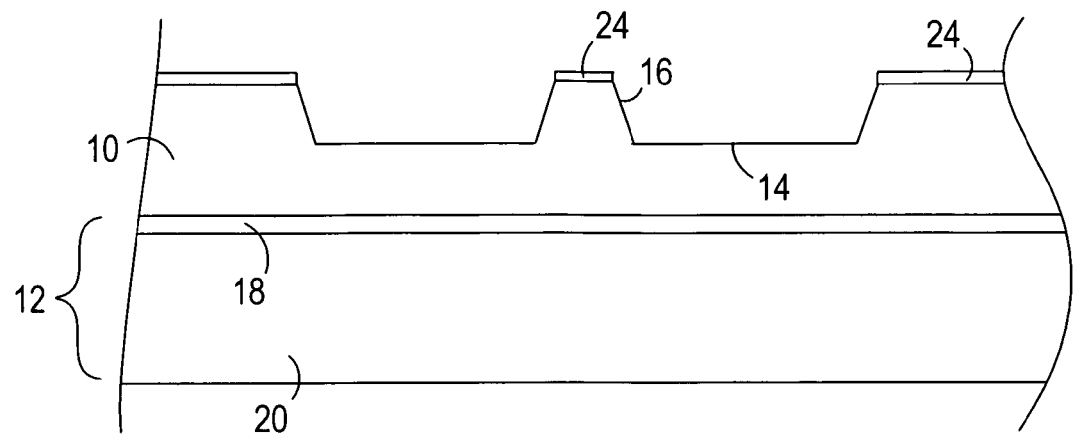
FIG. 7A through FIG. 7E illustrate a method of forming an optical device that includes a phase modulator.
Figure 7B:
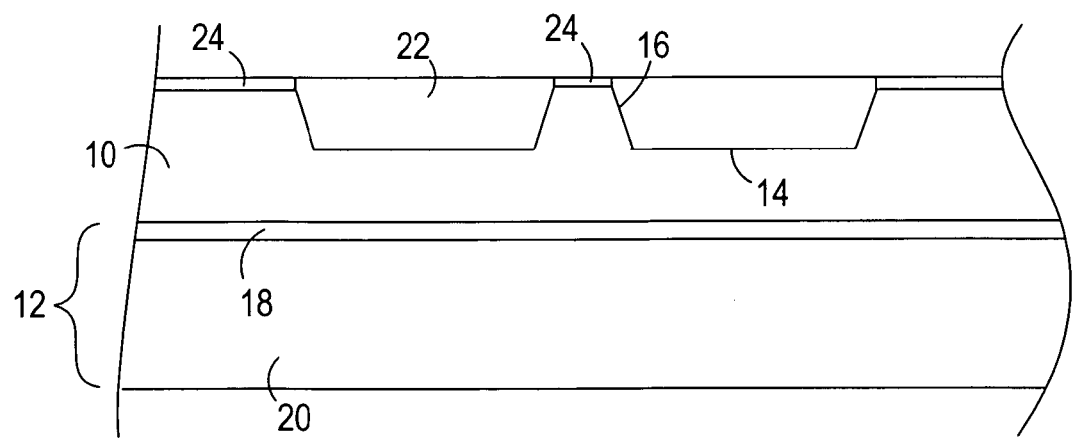
Figure 7C:
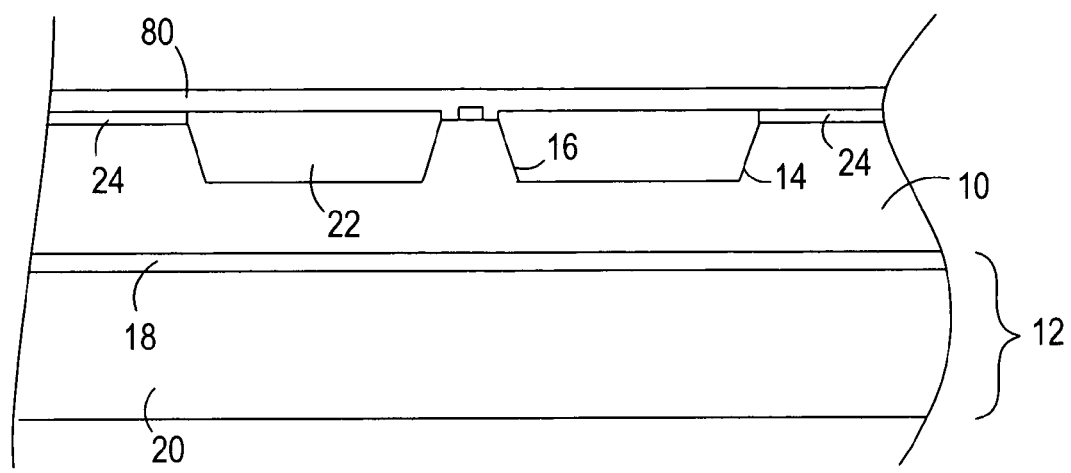

The filler 22 is deposited on the device precursor and the result is planarized to generate the device precursor illustrated in FIG. 7B. A suitable method for depositing a filler such as silica includes, but is not limited to, deposition methods such as sputtering and chemical vapor deposition. A suitable method for planarizing the filler includes, but is not limited to, chemical-mechanical polishing (CMP). During CMP of a material such as silica, an insulating layer 24 constructed of a material such as silicon nitride can serve as a stop. Accordingly, the insulating layer 24 remains substantially intact after the planarization process.

Portions of the insulating layer 24 are removed so as to generate openings 84 for the contacts. A layer of the contact material 80 is deposited on the result so as to provide the device precursor illustrated in FIG. 7C. A suitable method for removing the insulating layer 24 include, but are not limited to, photolithography and dry etching. A suitable method for depositing contact materials 80 such as polysilicon includes, but is not limited to, deposition methods such as chemical vapor deposition (CVD).

The contact material 80 is patterned so as to form the contacts 34 on the device precursor. A suitable method of patterning the contact material 80 includes, but is not limited to, photolithography and etching.

Figure 7D:
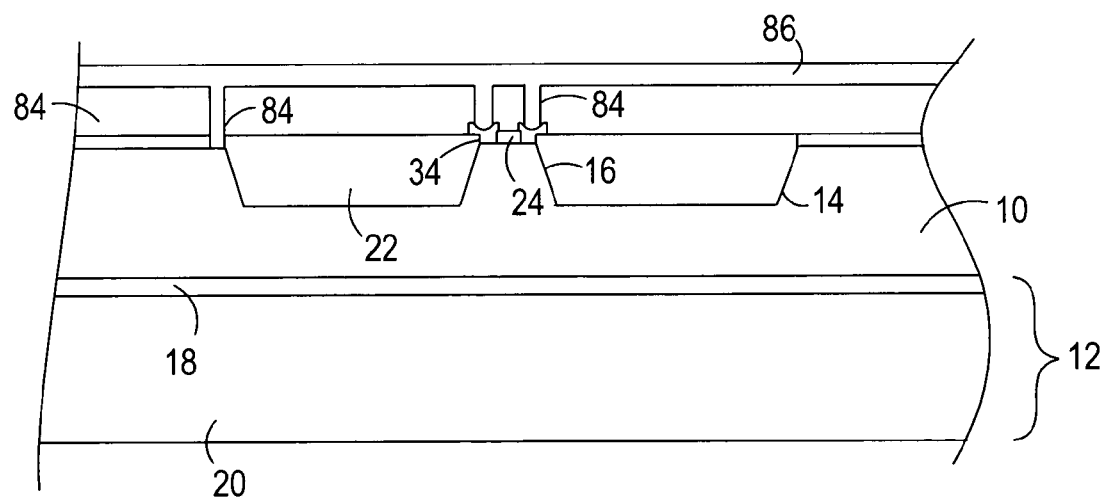
Figure 7E:
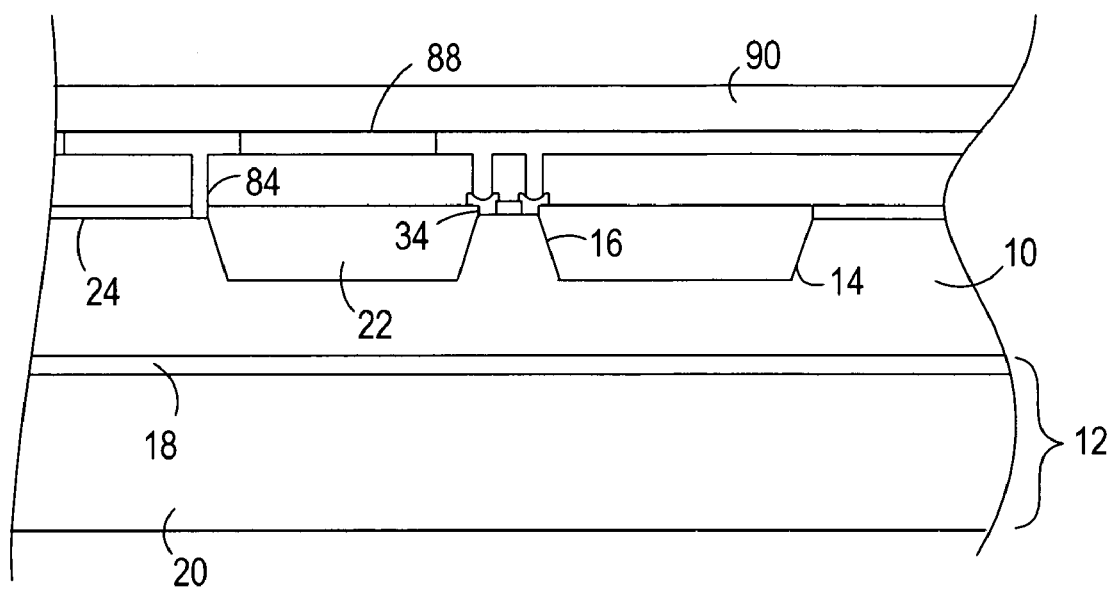

A first portion of the upper layer material 82 is deposited on the device precursor. The first portion of the upper layer material 82 is patterned so as to expose openings 84 for the connectors and the connector material 86 is deposited on the device precursor so the connector material 86 fills the holes as shown in FIG. 7D. A suitable method for depositing an upper layer material such as silica includes, but is not limited to, sputtering, spin coating, and chemical vapor deposition (CVD). A suitable method of patterning the first portion of the upper layer includes, but is not limited to, photolithography and etching. A suitable method for depositing a connector material 86 such as tungsten includes, but is not limited to, chemical vapor deposition (CVD) or sputtering.

The device precursor is planarized to the level of the first portion of the upper layer. A suitable method for planarizing the connector material 86 includes, but is not limited to, chemical-mechanical polishing (CMP).

A second portion of the upper layer material 88 is deposited on the device precursor. The second portion of the upper layer material 88 is patterned so as to expose openings for the first conducting member 26 and the second conducting member 28. The material for the first conducting member 26 and the second conducting member 28 is deposited on the device precursor so the connector material 86 overfills the holes. The first member 26 and the second member 28 are formed by planarizing the device precursor to the second portion of the upper layer material 88. A third portion of the upper layer material 90 is deposited on the device precursor to generate the optical device of FIG. 7E. A suitable method for depositing second upper layer material such as silica and silicon nitride includes, but is not limited to, sputtering, spin coating, and deposition methods such as chemical vapor deposition (CVD). A suitable method of patterning the second portion of the upper layer material includes, but is not limited to, photolithography and etching. A suitable method for depositing a material such as aluminum for the first conducting member 26 and the second conducting member 28 includes, but is not limited to, sputtering and chemical vapor deposition (CVD). A suitable method for planarizing the material for the first conducting member 26 and the second conducting member 28 includes, but is not limited to, chemical-mechanical polishing (CMP). A suitable method for depositing second upper layer material such as silica includes, but is not limited to, sputtering, spin coating, and deposition methods such as chemical vapor deposition (CVD).

The above method for generating the optical device is disclosed in the context of a silicon-on-insulator wafer. Accordingly, the materials and methods are disclosed in conjunction with a silicon light-transmitting medium 10. These materials and techniques may be effective when employed with different light-transmitting media, however, different light-transmitting media may require changes to the above techniques and/or materials.

Although the intensity modulator is disclosed in the context of a digital modulator where a high intensity output or a low intensity output is desired, the intensity modulator can also be operated as an analog modulator. For instance, the phase modulator(s) included in the intensity modulator can be operated so as to produce intensities between or outside of the high intensity output and the low intensity output.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of modulating a light signal, comprising:
   applying bias signals to a plurality of phase modulators positioned along a waveguide such that each of the phase modulators receives a different one of the bias signals, the waveguide being on a substrate and having a light signal carrying region,
   each of the phase modulators including an n-type region having a proximity to a p-type region that causes a depletion region to form when a bias is not applied to the modulator, the depletion region being at least partially positioned in the light signal carrying region of the waveguide,
   the application of the bias signals to each of the phase modulators causing modulation of a light signal traveling through the waveguide by changing the depletion regions; and
   delaying the application of the bias signals to different phase modulators, the delay synchronizing the light signal and the bias signals so each bias signal causes modulation of the same portion of the light signal.

2. The method of claim 1, wherein the proximity between the n-type regions and the p-type regions is such that each of the n-type regions contacts one of the p-type regions.

3. The method of claim 1, wherein the depletion regions are each at least partially positioned in a ridge of the waveguide.

4. The method of claim 1, further comprising:
   applying a positive bias to the phase modulators at level below a threshold where carrier recombination occurs.

5. The method of claim 1, wherein a plurality of continuous and unbroken transmission lines are connected to the phase modulators such that each of the phase modulators is connected to a different one of the transmission lines, and
   the phase modulators each includes a plurality of sub-modulators that are each connected to the transmission line that is connected to that phase modulator, each transmission line carries a bias signal to each of the sub-modulators, the sub-modulators being spaced apart from one another along a length of the waveguide, the length of the sub-modulators and the spacing between the sub-modulators being selected such that the average speed of the bias signal through the transmission line connected to those sub-modulators is about the same as the average speed of a light signal traveling through the phase modulator that includes those sub-modulators.

6. The method of claim 5, wherein the transmission line is configured such that a direction of propagation of the bias signal through the transmission line is substantially parallel to the waveguide.

7. The method of claim 1, wherein applying the bias signals tunes the size of the depletion regions.

8. The method of claim 1, wherein the phase modulators each includes electrical contacts positioned on a ridge of the waveguide such that the electrical contacts included in one of the phase modulators are spaced apart from one another at the top of the ridge.

9. The method of claim 8, wherein the electrical contacts include doped polysilicon.

10. The method of claim 1, wherein the phase modulators each includes electrical connections for applying a bias signal to the waveguide at locations that are spaced apart from one another on top of the waveguide.

11. The method of claim 10, wherein the electrical connections included in each one of the phase modulators are configured to apply the bias signal to positions on opposing edges of the ridge.

12. The method of claim 1, wherein the phase modulators each includes electrical connections for applying a bias signal at a contact region of the modulator, wherein the contact region is located adjacent to the waveguide and spaced apart from the waveguide.

13. The method of claim 12, wherein the contact region of each modulator includes a secondary doped region in contact with and having a higher carrier concentration than the n-type region or the p-type region.

14. The method of claim 13, wherein the secondary doped region includes the same dopant type as the n-type region or the p-type region with which the secondary doped region is in contact.

15. The method of claim 1, wherein the waveguide is defined in a light transmitting medium that includes recesses that define a ridge of the waveguide, and further comprising:
   electrical connections for applying a bias signal to the light transmitting medium at a contact location that is fully or partially on an opposite side of a recess from the waveguide.

16. The method of claim 1, wherein the waveguide is silicon and a concentration of the carriers in the n-type regions is $10^{16}/cm^3$ to $10^{17}/cm^3$.

17. The method of claim 1, wherein the waveguide is silicon and a concentration of the carriers in the p-type regions is $10^{16}/cm^3$ to $10^{17}/cm^3$.

18. The method of claim 1, wherein each of the phase modulators includes a plurality of sub-modulators connected to a transmission line that carries a bias signal to each of the sub-modulators, the sub-modulators being spaced apart from one another along a length of the waveguide.

* * * * *